US009468118B1

(12) United States Patent
Peters

(10) Patent No.: US 9,468,118 B1
(45) Date of Patent: Oct. 11, 2016

(54) REINFORCED STRUCTURAL COMPOSITE

(71) Applicant: Amazon Technologies, Inc., Reno, NV (US)

(72) Inventor: David Eric Peters, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 14/137,283

(22) Filed: Dec. 20, 2013

(51) Int. Cl.
*G06F 1/16* (2006.01)
*H05K 5/04* (2006.01)
*B32B 15/04* (2006.01)
*B32B 5/18* (2006.01)

(52) U.S. Cl.
CPC . *H05K 5/04* (2013.01); *B32B 5/18* (2013.01); *B32B 15/046* (2013.01); *G06F 1/16* (2013.01); *G06F 1/1626* (2013.01)

(58) Field of Classification Search
CPC .................................................. G06F 1/1626
USPC .................... 361/679.01; 29/527.1, 729, 739; 428/613
See application file for complete search history.

(56) References Cited

U.S. PATENT DOCUMENTS

| | | | |
|---|---|---|---|
| 3,668,031 A * | 6/1972 | Bast | B29C 44/1223 156/79 |
| 3,834,881 A * | 9/1974 | Niebylski | B32B 15/00 267/130 |
| 5,482,533 A * | 1/1996 | Masuda | B22D 27/00 164/79 |
| 5,682,289 A * | 10/1997 | Schwegler | G06F 1/183 361/679.33 |
| 5,925,847 A * | 7/1999 | Rademacher | B29C 45/14778 174/372 |
| 6,085,965 A * | 7/2000 | Schwartz | B22F 7/006 228/190 |
| 6,096,416 A * | 8/2000 | Altenberg | B32B 3/06 156/78 |
| 6,444,330 B1 * | 9/2002 | Abels | B22F 3/1118 419/66 |
| 6,768,654 B2 * | 7/2004 | Arnold | B29C 45/14811 174/394 |
| 6,955,167 B2 * | 10/2005 | Baratta | B23D 45/046 125/13.01 |
| 6,996,425 B2 * | 2/2006 | Watanabe | H04M 1/18 379/433.01 |
| 7,137,433 B2 * | 11/2006 | Dobesberger | B22D 19/08 164/23 |
| 7,790,637 B2 * | 9/2010 | DiFonzo | B29C 70/083 442/179 |
| 8,755,192 B1 * | 6/2014 | Schrempp | G06F 1/20 361/679.5 |
| 8,873,226 B1 * | 10/2014 | Peters | G06F 1/1613 361/679.01 |
| 9,084,383 B2 * | 7/2015 | Aurongzeb | H05K 13/00 |
| 2003/0141032 A1 * | 7/2003 | Singer | B22D 17/00 164/79 |

(Continued)

*Primary Examiner* — Adrian S Wilson
(74) *Attorney, Agent, or Firm* — Seyfarth Shaw LLP; Ilan N. Barzilay; Joseph M. Walker

(57) ABSTRACT

A foam layer may be reinforced by applying a primer layer prior to application of a metal or other absorbent layer. The primer layer seals the foam layer so that the foam layer does not absorb portions of the metal layer in a manner that may significantly increase the weight of the foam layer. Thus the foam layer may be reinforced by metal layers while maintaining its low weight properties. The reinforced foam layer may be used to create a component for an electronic device.

19 Claims, 11 Drawing Sheets

(56) References Cited

U.S. PATENT DOCUMENTS

| | | | | |
|---|---|---|---|---|
| 2008/0252552 A1* | 10/2008 | Goebel | H01Q 1/246 | 343/872 |
| 2009/0095523 A1* | 4/2009 | Stevenson | B29C 70/222 | 174/565 |
| 2009/0110852 A1* | 4/2009 | Chiang | G06F 1/1613 | 428/34.7 |
| 2009/0190290 A1* | 7/2009 | Lynch | H05K 5/0086 | 361/679.01 |
| 2009/0260871 A1* | 10/2009 | Weber | H05K 5/0217 | 174/535 |
| 2010/0289390 A1* | 11/2010 | Kenney | B29C 43/006 | 312/223.1 |
| 2011/0122562 A1* | 5/2011 | Lev | G06F 1/1616 | 361/679.27 |
| 2011/0290685 A1* | 12/2011 | Kenney | G06F 1/1656 | 206/320 |
| 2013/0044451 A1* | 2/2013 | Tang | G06F 1/1626 | 361/807 |
| 2013/0327568 A1* | 12/2013 | Wang | H05K 5/0008 | 174/565 |
| 2014/0007983 A1* | 1/2014 | Prest | B22D 19/0081 | 148/403 |
| 2015/0309194 A1* | 10/2015 | Sumi | G03B 42/04 | 250/394 |

* cited by examiner

REINFORCED STRUCTURAL COMPOSITE

BACKGROUND

Electronic devices, such as computers, laptop computers, cellular phones, personal digital assistants (PDA), tablet computers and other mobile devices, include a number of parts. These parts include, for example, an outer housing, made of metal or a plastic material.

BRIEF DESCRIPTION OF DRAWINGS

For a more complete understanding of the present disclosure, reference is now made to the following description taken in conjunction with the accompanying drawings.

DETAILED DESCRIPTION

Figure 1:
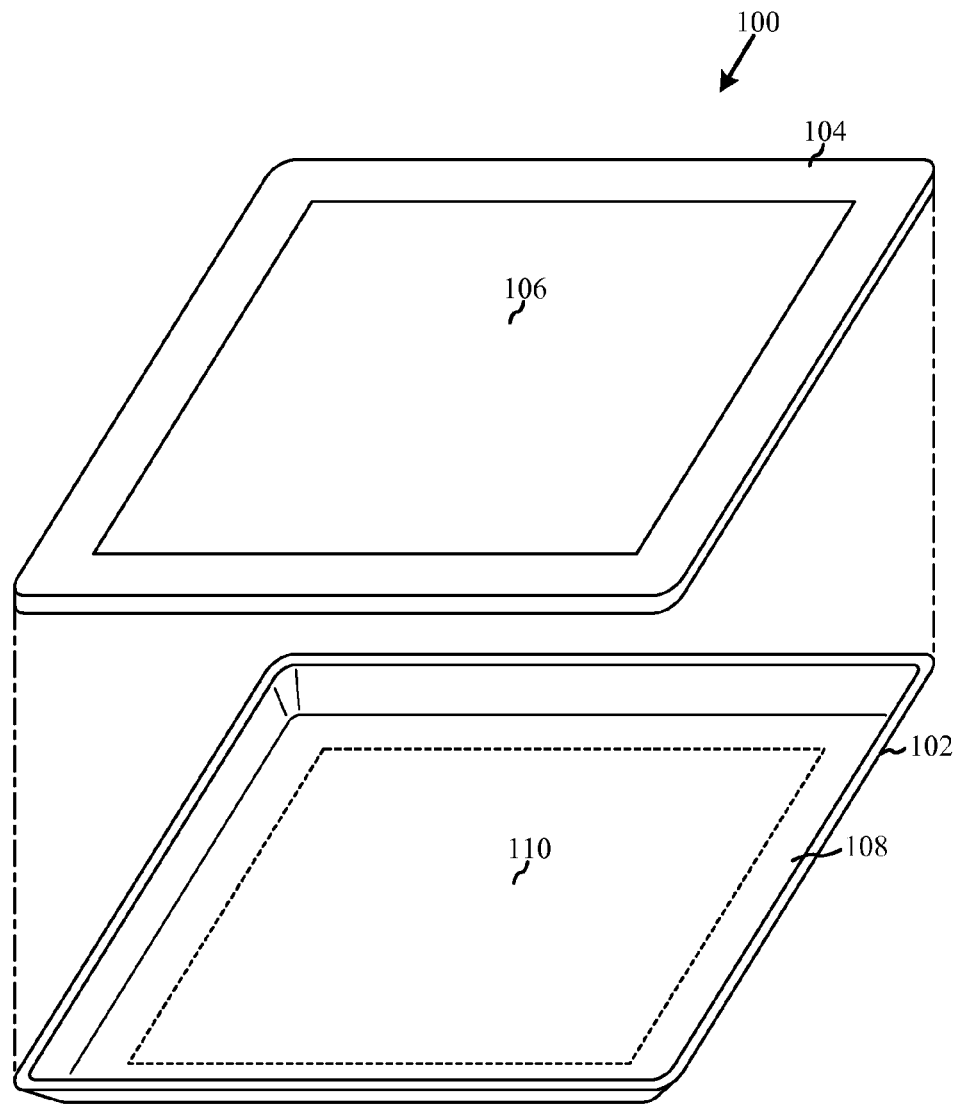
FIG. 1 illustrates a device housing according to an aspect of the disclosure.

Aspects of the present disclosure include devices and methods for making and using structural components using combinations of materials. In one aspect, the disclosure combines the use of metals (for example, aluminum, titanium, magnesium, stainless steel, etc.) with lightweight reinforced structural composites, such as structurally reinforced foams. In an example, a housing of a computing device, such as a computer, laptop computer, cellular phone, personal digital assistant (PDA), tablet computer, electronic reader or e-reader, or other mobile device may be constructed using the combination of the metal or other structural material in the form of a frame surrounding a foam, or other low density panel. This combination of materials allows for 3-dimensional (3-D) forming of the metal portion, incorporating the toughness in drop, tumble and other user abuses, while also taking advantage of the low-density properties of the foam portion.

In general, the structurally reinforced foam may be a layered composite in which a low density open cell or closed cell foam layer is reinforced by one or more layers of a structural material. The foam may be open or closed cell, rigid or flexible, or other type of foam as described below. One or more structural material layers may sandwich or otherwise at least partially encase the relatively low density foam layer, thereby forming a protective exoskeleton around the foam layer. The exoskeleton can include one or more materials that provide structural support, durability (i.e., the ability to withstanding normal wear and tear and other abuse from a user), and/or other type of protection to a second material, such as the foam layer, that is located behind the first material. For example, the structural material may comprise a relatively expensive but strong material that can complement the foam layer's light weight properties by providing structural support and reinforcement, resulting in the foam being protected from physical deformation, such as bending and/or puncture damage. The structural material may optionally provide additional protection to the foam such as protection from water damage, temperature effects, or the like. In one aspect the same structural material may be used to sandwich the low density central layer. In another aspect, different structural materials may be used on either side of the low density central layer. In one aspect, the structural material is a fiber composite such as a fiber composite of a type described below. The fiber composite may be a mesh. In another aspect, the structural material is a metallic composite such as a metallic composite of a type described below. The metallic composite may be a mesh. In yet another aspect, the foam layer may be coated with a primer to seal the foam, and plated with one or more metal layers.

Typically, a device housing, such as a rear housing or closure, is made of a single homogeneous material, such as aluminum or magnesium. However, such metal materials can be stiff, causing the metal materials to break or fail if subjected to significant forces, that may be caused by various reasons, including abuse of a user. Other materials, such as carbon fiber may also be used, but carbon fiber is difficult to shape into a 3-D monolithic single piece rear housing. Using a combination of metal and structurally reinforced foam decreases the weight of the computing device or other electronic device and maintains an appropriate stiffness to support glass or other types of displays and components that may be incorporated into the device. The combination of metal and structurally reinforced foam also provides for a higher durability allowing the device to withstand various abuses, such as if dropped by the user.

FIG. 1 illustrates a housing 100 of a computing device according to an aspect of the disclosure. As illustrated, the housing includes a rear housing 102 and a front housing 104. The front housing 104 may support a screen or display 106. In one aspect the front housing 104 may be comprised entirely of the display material 106. The front housing 104 and the rear housing 102 are coupled together and house internal components of the computing device, such as those components described below with reference to FIG. 2. In an aspect, the rear housing 102 includes a first portion or support frame 108 and a second portion or rear panel 110. The support frame 108 is coupled to and surrounds the rear panel 110. In this aspect, the support frame 108 may be a metal or plastic material, such as aluminum, titanium, magnesium, stainless steel, polymer, plated polymer, and combinations or composites thereof, etc., and the rear panel 110 is a foam, such as an open cell or closed cell, rigid or flexible foam. Some example foams are thermoset foam, a rigid or flexible polyurethane foam, a fiber reinforced foam, etc., or combinations thereof.

In an aspect, the rear panel 110 is a thermoset foam material that is reinforced on an outer surface face with a carbon fiber material, i.e. a fiber reinforced structural foam. Incorporating this fiber reinforced structural foam into the rear housing 102 allows for a density decrease from that of a homogeneous carbon fiber composite (which has a density of about 1.5 grams per cubic centimeter) to about 0.6-0.8 grams per cubic centimeter. Thus, the housing illustrated is more durable (i.e., more capable of withstanding normal wear and tear and other abuse from a user) and lighter than that of previous devices.

In another aspect, the rear panel 110 is a layered composite in which an open cell or closed cell foam layer is sandwiched between two layers of a metallic mesh. In yet another aspect, the rear panel 110 is a layered composite in which an open cell or closed cell foam layer is coated with a primer, and plated with one or more metal layers.

In an example, a traditional 8.9 inch tablet may include a rear housing that is made of a magnesium diecast surface. Using the combination of metal or plastic and structurally reinforced foam described above, the weight of the rear housing may be decreased by about 20 grams due to the structurally reinforced foam plus frame construction being less dense than a surface comprised entirely of the metal (or other material) of the frame.

Figure 2:
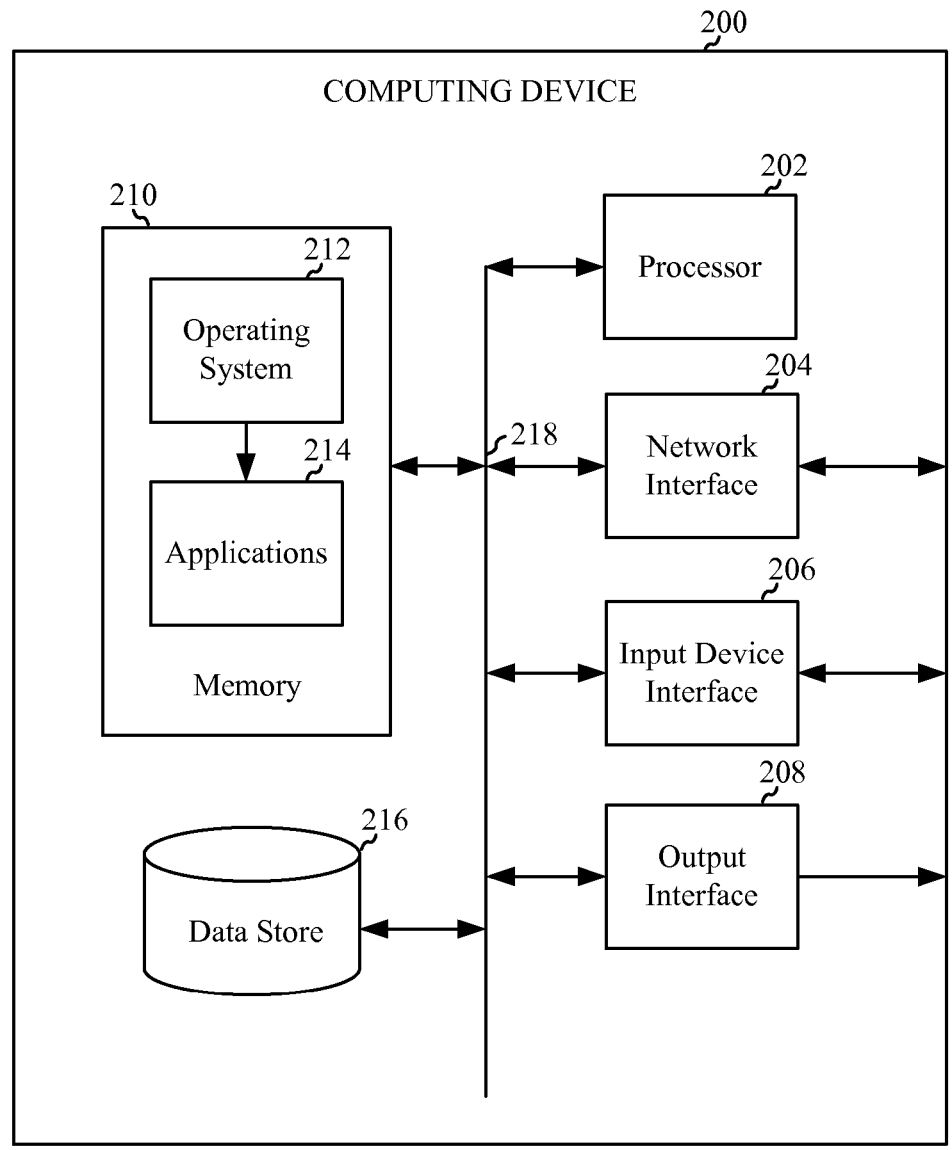
FIG. 2 illustrates a block diagram conceptually illustrating a computing device according to one aspect of the present disclosure.

A general architecture of a computing device is described below with reference to FIG. 2. More particularly, FIG. 2 is a block diagram illustrating exemplary components of a computing device 200. However, the following description of the exemplary components of the computing device 200 should be viewed as illustrative only and not construed as limiting in any manner. In one aspect, the housing 100 shown in FIG. 1 may house one or more of the exemplary components of the computing device 200, for example.

The exemplary computing device 200 may include a processor 202 in communication with a variety of other components over a system bus 218 or through a direct connection. These other components may include, by way of example, a network interface 204, an input device interface 206, an output interface 208, and a memory 210. As appreciated by those skilled in the art, the network interface 204 enables the computing device 200 to communicate data, control messages, data requests, and other information with other resources including computers, data sources, storage devices, and the like, on a computer network such as the Internet. The network interface 204 may be configured to communicate via wired or wireless connections.

The input device interface 206, sometimes also embodied as an input/output interface, enables the computing device 200 to obtain data input from a variety of devices including, but not limited to, a microphone, a digital pen, a touch screen, a keyboard, a mouse, a scanner, and the like. In addition to the exemplary components described above, the output interface 208 may be used for outputting information such as audio signals or display information. Display information may be output by the output interface 208 via a display device (e.g., a monitor or similar device), for example, display 106 shown in FIG. 1.

The processor 202 may be configured to operate in accordance with programming instructions stored in a memory 210. The memory 210 generally comprises RAM, ROM, and/or other memory. Thus, in addition to storage in read/write memory (RAM), programming instructions may also be embodied in read-only format, such as those found in ROM or other permanent memory. The memory 210 may store an operating system 212 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 210 may also store user-executable applications 214, or programs, for conducting various functions on the computing device 200. The computing device 200 optionally includes a data store 216 for storing data and other information on the computing device 200.

Figure 3A:
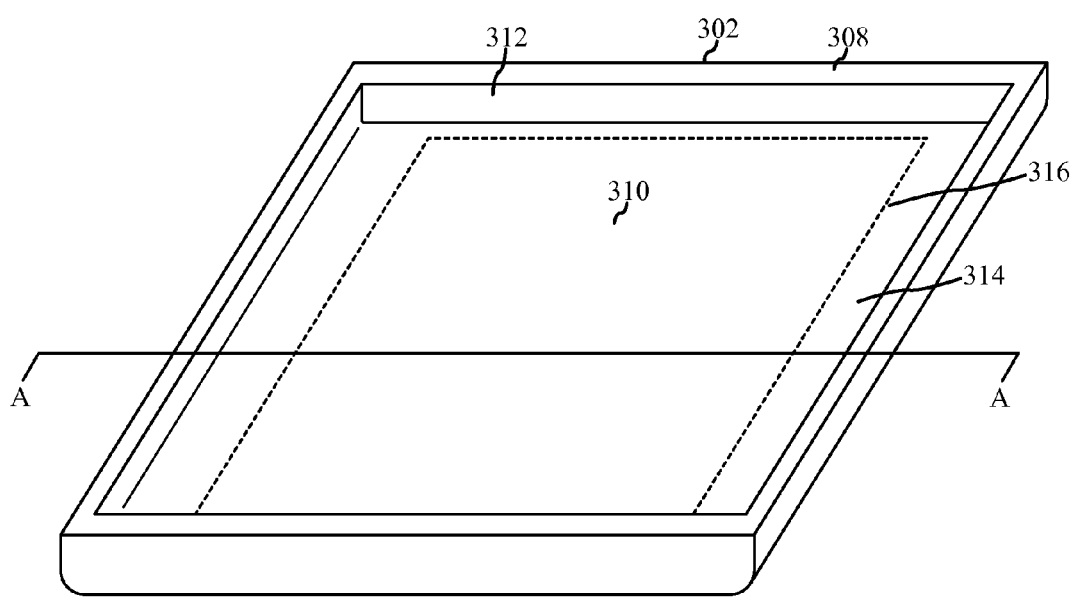
FIG. 3A illustrates a rear portion of a device housing according to an aspect of the disclosure.

As described above, the components of the computing device 200 may be housed in a housing have a rear portion made of the structurally reinforced foam, such as housing 100. FIG. 3A illustrates another rear housing 302, which may be the same as rear housing 102, of a computing device. The rear housing 302 includes a first portion or support frame 308 and a second portion or rear panel 310. The support frame 308 may be a metal or plastic material, and the rear panel 310 is a structurally reinforced foam.

The structurally reinforced foam may be a fiber reinforced structural foam; a layered composite in which an open cell or closed cell foam layer is sandwiched between two layers of a metallic mesh; a layered composite in which an open cell or closed cell foam layer is coated with a primer to seal the foam, and plated with one or more metal layers; or combinations thereof. In an aspect, the foam is an open cell or closed cell, rigid or flexible foam. Some example foams are thermoset foam, a rigid or flexible polyurethane foam, a fiber reinforced foam, etc., or combinations thereof.

The support frame 308 includes sides 312 that extend vertically or perpendicular to a base portion 314. The base portion forms an aperture substantially at a central location of the support frame 308. The rear panel 310 is disposed in the aperture and coupled to edges 316 of the base portion 314 to form the flat plane of rear housing 302. This allows the rear panel 310 to be formed in the form of a substantially flat panel and integrated into the support frame 308. It can be difficult to create 3-D structures (such as vertical walls perpendicular to a base) using structurally reinforced foams, thus, by incorporating a substantially flat panel made of the foam into the support frame 308 made of a different rigid material, the manufacturing of the rear housing 302 incorporating the structural benefits of the foam can be simplified.

Figure 3B:
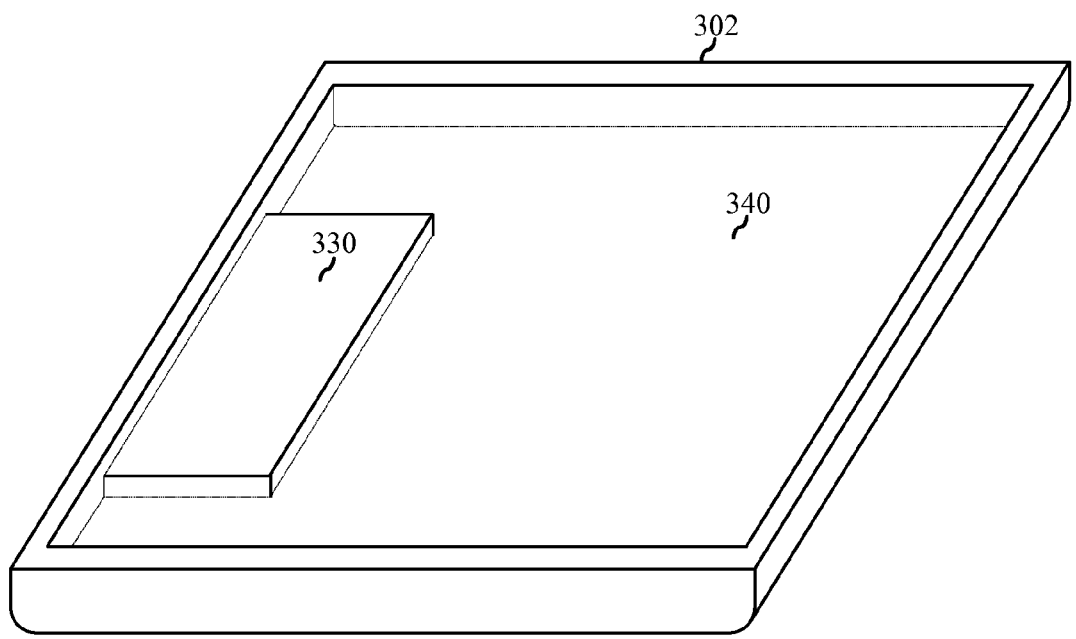
FIG. 3B illustrates a rear portion of a device housing according to an aspect of the disclosure.

In another aspect other configurations of the housing may incorporate a foam composite such as that presently disclosed. In one configuration, an entire rear housing may be made of the foam composite, where a foam layer is surrounded by protective layers makes up the entire rear housing or rear portion of an external case. In another aspect, other shapes of rigid material (other than a frame) may be combined with a foam composite section (or multiple foam composite sections) to create a housing, external case or otherwise. In another aspect, the foam composite portion of the housing may be constructed so that the foam portion is not flat, but rather has a three-dimensional profile. This may be particularly applicable when constructing portions of the housing that will enclose certain shapes or configurations of computing devices. For example, as shown in FIG. 3B, an entire rear housing 302 may be made from the foam composite with the housing having certain raised portions, such as illustrated raised portion 330. Other configurations and shapes of raised portions are possible. A foam composite housing, such as the housing of FIG. 3B may be formed as a single monolithic structure, where raised portion 330, housing floor 340, and other parts of the housing are part of a single structure. Portions of the foam composite may be constructed be very thin, whether the foam composite makes up the entire housing or only portions thereof. The foam composite, either in the form illustrated in FIG. 3B or otherwise may include multiple layers as described herein.

FIGS. 4 and 5A-C illustrate sectional views of the rear housing 302 along the line A-A shown in FIG. 3A. As illustrated, the support frame 308 may be a monolithic single piece structure made of a material, such as, aluminum, titanium, magnesium, stainless steel, polymer, plated polymer, etc. In an aspect, the support frame 308 is metal and may be forged, diecast, or cut using a computer numerical control (CNC) machine to the desired shape. In another aspect, the support frame 308 is a polymer and is injection molded to form the desired shape. In this aspect, the support frame 308 may also be plated with metal, for example, copper and nickel, copper and cobalt, etc. to form a plated polymer.

Figure 4:
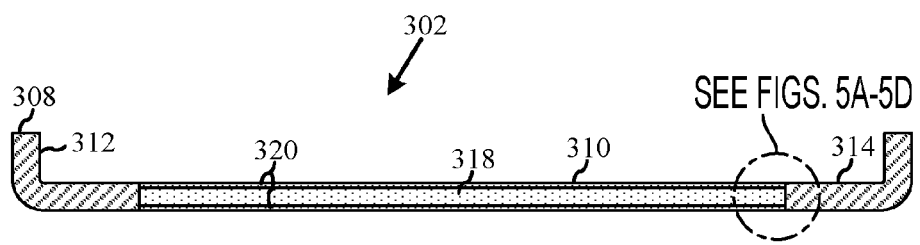
FIG. 4 illustrates a sectional view of the rear housing portion of FIG. 3A taken along line A-A according to an aspect of the disclosure.
Figure 5A:
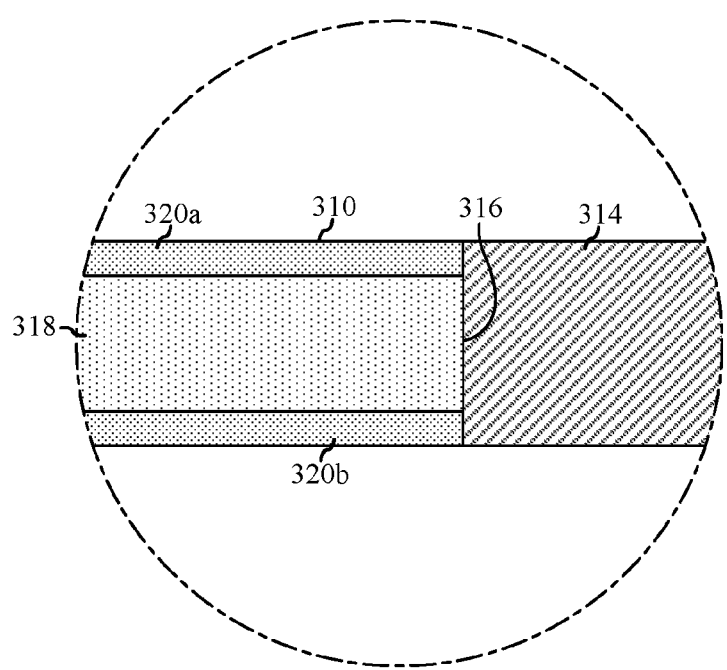
FIG. 5A illustrates an enlarged sectional view of the rear housing portion of FIG. 4 according to an aspect of the disclosure.

As illustrated in FIGS. 4 and 5A, the rear panel 310 is a fiber reinforced structural foam. The fiber reinforced structural foam is a layered structure, including a core layer 318 and outer layers 320 that sandwich the core layer 318. As illustrated, the core layer 318 is disposed between a first layer 320a and a second layer 320b of the outer layers 320. The core layer 318 may be an open or closed cell, rigid or flexible, foam, for example, elastomeric foam, ridged or flexible polyurethane foam, thermoset foam (i.e. foam that cures upon application of heat), syntactic foam (for example, a glass sphere filled plastic), or other foam or combinations thereof. The outer layers 320 may be a fiber skin or exoskeleton layer that provides structural stiffness to the core layer 318. The outer layers 320 may be a fiber, for example, glass fiber (i.e., comprised of fine fibers of glass), carbon fiber (i.e., comprised of carbon atoms), fiberglass (i.e., comprised of a polymer reinforced with glass fibers), aramid fiber such as Kevlar (i.e., comprised of fibers in which chain molecules are highly oriented along the fiber axis), organic fiber (i.e. flax, cellulose, wood-pulp, and other such fibers), ceramic fiber, metallic fiber, or other fiber of the type or combinations thereof. The rear panel may be of varying thicknesses, but in one aspect may be approximately 800 microns in thickness.

Figure 5B:
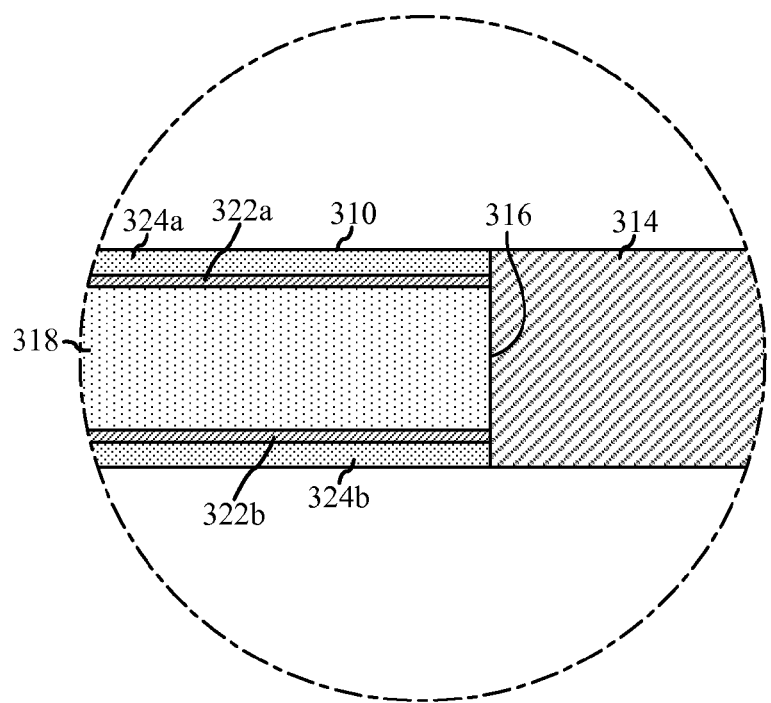
FIG. 5B illustrates an enlarged sectional view of the rear housing portion of FIG. 4 according to another aspect of the disclosure.

As illustrated in FIG. 5B, the rear panel 310 is a structurally reinforced foam. The rear panel may include a composite structure where the structurally reinforced foam includes a layered structure. The structurally reinforced foam may include a foam core layer 318, internal layers 322a and 322b disposed on opposite sides of the core layer 318, and external layers 324a and 324b disposed on the internal layers 322a and 322b, respectively. The internal layers 322a and 322b may be primer layers that seal the core layer 318, and the external layers 324a and 324b may be metal layers plated on the internal layers 322a and 322b, respectively. In this aspect, the internal layers 322a and 322b are sealing layers that allow for the plating of the external layers 324a and 324b onto the core layer 318.

The primer layers may be a metallic coating such as, a metallic paint, ink and/or other material that may be applied to the foam to seal the foam and otherwise compliment the foam's lightweight properties. The metallic paint or ink may be a silver nitrate type paint or ink, a silver infused paint or ink, a palladium infused paint or ink, or other metallic paint or ink, and/or combinations thereof. The plated metal layers may be copper, nickel, copper-nickel, copper-cobalt, copper-nickel-chrome, nickel-chrome, cobalt, gold, silver, or other metals, and/or combinations thereof capable of being plated, such as by electroplating, onto the primer layers. In one example, the primer layer is a silver nitrate paint or ink, and the plated metal layers are nickel.

If a metal layer were formed onto a foam layer directly, the metal layer may be absorbed into the foam to a certain degree. For example, a metal layer disposed directly onto the foam may be absorbed into the form about 100 microns deep. The foam would thus gain in weight as a result of the absorbed metal. When a primer layer is first added to the foam, the primer layer also penetrates the foam, but to a significantly lesser degree, for example less than 100 microns and as little as only 6 to 8 microns or less in some embodiments. If the primer is first applied to the foam, the primer seals the foam. When the metal layers are then applied to the primer layer, the metal layers are not absorbed by the foam (at least not to the same degree as without the primer), thus resulting in a lighter core foam layer, and a resulting lighter rear panel.

Figure 5C:
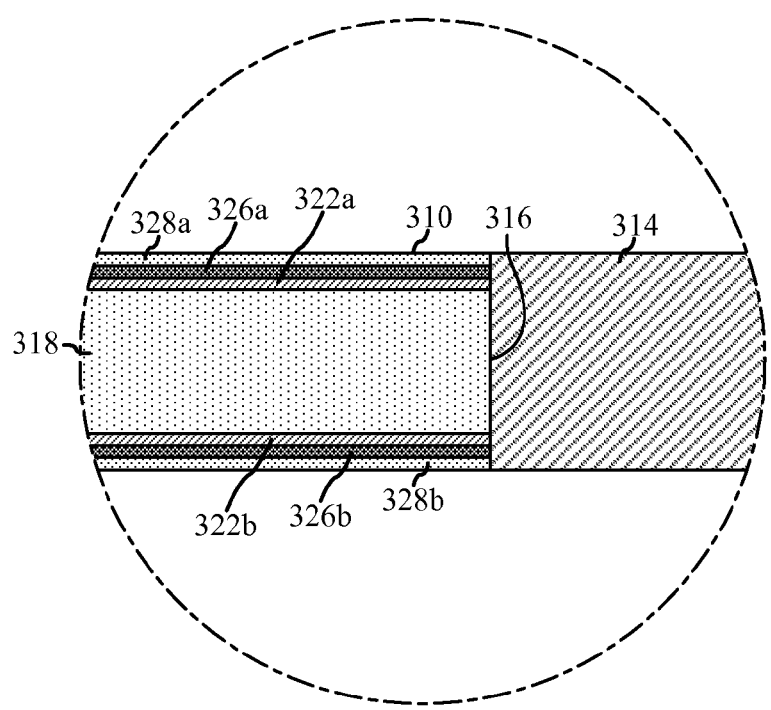
FIG. 5C illustrates an enlarged sectional view of the rear housing portion of FIG. 4 according to another aspect of the disclosure.

As illustrated in FIG. 5C, the rear panel 310 is a structurally reinforced foam. In this aspect, the structurally reinforced foam is a layered structure, including the core layer 318, the internal layers 322a and 322b, middle layers 326a and 326b disposed on the internal layers 322a and 322b, respectively, and external layers 328a and 328b disposed on the middle layers 326a and 326b, respectively. In this aspect, the middle layers 326a and 326b may be metal layers plated on the internal layers 322a and 322b, respectively, and the external layers 328a and 328b may be additional metal layers plated on the middle layers 326a and 326b, respectively. In another aspect a different number (or type) of layers may be applied to the side of the panel that will be facing electrical components (i.e., the "a" side toward the upper portion of FIGS. 5B and 5C) than to the side of the panel that may be facing the exterior of a device (i.e., the "b" side toward the lower portion of FIGS. 5B and 5C). Thus, a different measure of protection may be provided to different faces of the panel that may be exposed to different types of stresses.

As described above, the plated metal layers may be copper, nickel, copper-nickel, copper-cobalt, copper-nickel-chrome, nickel-chrome, cobalt, gold, silver, or other metals, and/or combinations thereof capable of being plated, such as by electroplating, onto the primer layers and/or the preceding metal layer. For example, the middle layers 326a and 326b may be a softer type metal (such as copper) and/or a less decorative material than the external layers 328a and 328b. This is because the middle layers 326a and 326b may function as a binding layer for and may be hidden or covered by stronger and/or more decorative external layers 328a and 328b (such as nickel).

Figure 5D:
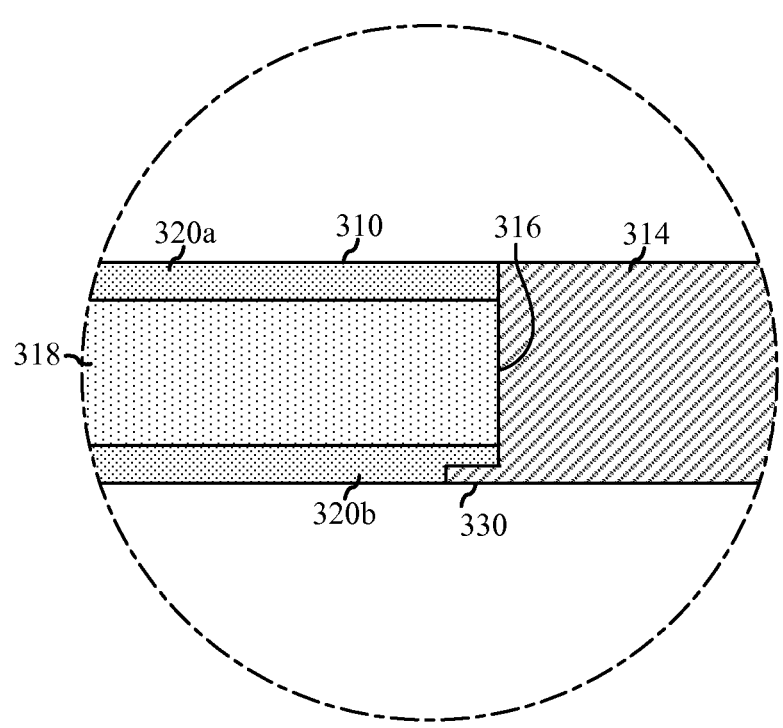
FIG. 5D illustrates an enlarged sectional view of the rear housing portion of FIG. 4 according to another aspect of the disclosure.

Referring to FIG. 5D, in an aspect, the support frame 308 may include a ledge or lip 330 that projects into the aperture. The lip 330 may extend around the perimeter of and extend into the aperture in the support frame 308 described above. The rear panel 310 may be disposed on the lip 330 and coupled to the lip 330. For example, a portion of the rear panel 310 may overlap and be coupled to the lip 330 to secure the rear panel 310 to the support frame 308. The portion of the rear panel near the lip may be mechanically coupled to the support frame 308 and/or lip 330. For example, when computing device is constructed, the housing portion including the support frame 308 may be compressed to other components of the computing device. In this situation, the frame may be held into the frame using pressure from the other components of the computing device. Other forms of mechanical coupling other than compression may be used, such as clips, screws, coupled fittings, etc.

In the aspects described above, the rear panel 310 may have a thickness of about 500 microns to about 1000 microns, and more specifically, about 800 microns. In one aspect, a foam composite portion of a housing may be less than 3 millimeters at the thinnest point of the foam composite portion of the housing. That 3 millimeters may include any primer layer(s) or metallic layer(s) disposed on a foam layer of the foam composite.

However, it should be appreciated by those skilled in the art that the thickness of the structurally reinforced foam may be varied and adapted to various uses.

Further, the layers disposed on the foam to provide structural support may be comprised of different materials based on the desired properties. For example, heat dissipation properties of the layer proximal to internal components of the computing device 200 (such as the first layer 320a of FIG. 5A, the internal layer 322a and external layer 324a of FIG. 5B, and the internal layer 322a, external layer 328a and middle layer 326a of FIG. 5C) may be important, while hardness and durability of the layer proximal to or forming the external surface of the rear panel 310 (such as the second layer 320b of FIG. 5A, the internal layer 322b and external layer 324b of FIG. 5B, and the internal layer 322b, external layer 328b and middle layer 326b of FIG. 5C) may be important. Thus, the different aspects described with reference to FIGS. 5A-5C may be combined and or modified to incorporate the aspects of each other. In an example, the first layer 320a may be a metal layer, such as described with reference to FIGS. 5B and 5C, and the second layer 320b may be the fiber layer, such as described with reference to FIG. 5A. In another example, one or more layers toward the interior of the computing device may be removed and internal components of the computing device may come into contact directly with the fiber layer (or other internal layers).

Referring to FIGS. 4 and 5A-C, the rear panel 310 is coupled to the edges 316 of the base portion 314 to form the rear housing 302. In an aspect, the rear panel 310 may be coated with a thermoplastic material to allow the rear panel 310 to be bonded to the support frame 308 during an injection molding process. The rear panel 310 may be coupled to the edges 316 using a number of technologies including using an adhesive, a mechanical and/or other type of physical coupling technique.

Figure 6:
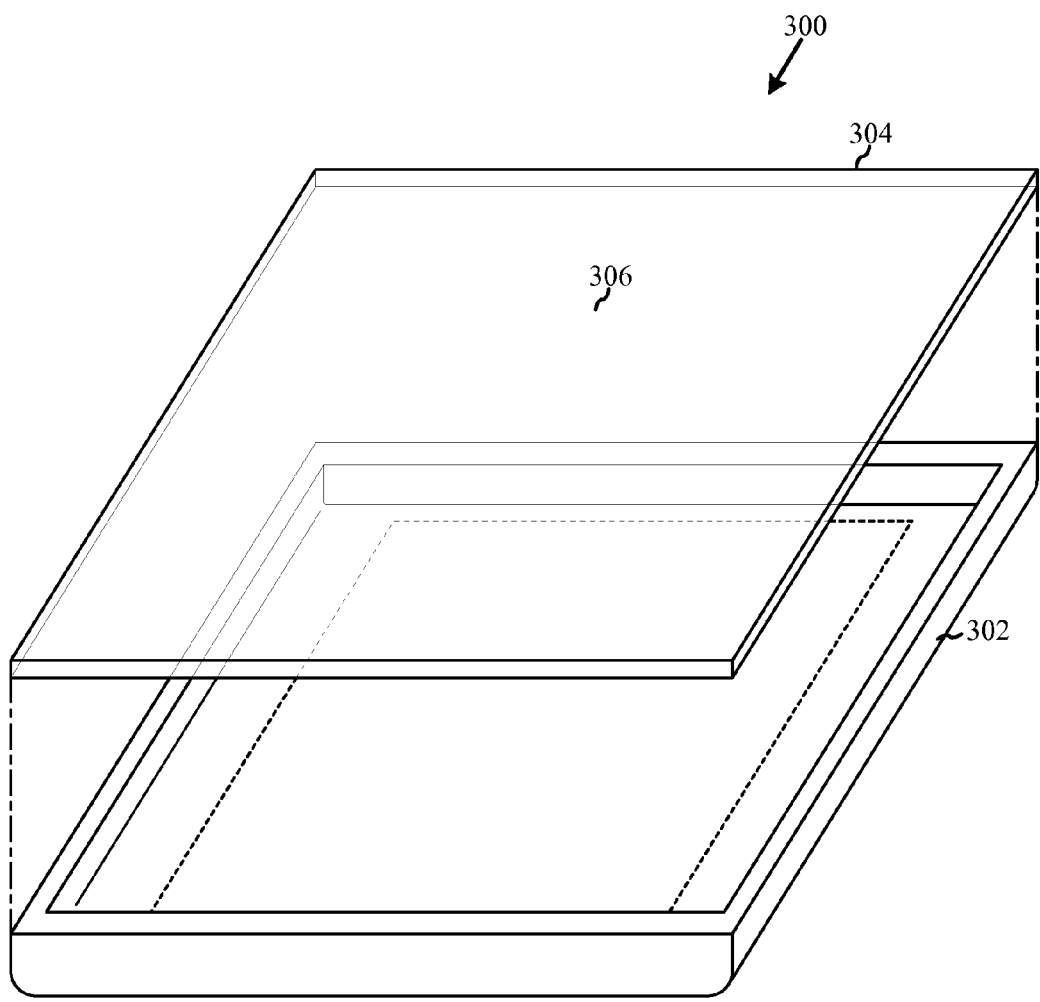
FIG. 6 illustrates another device housing according to an aspect of the disclosure.
Figure 7:
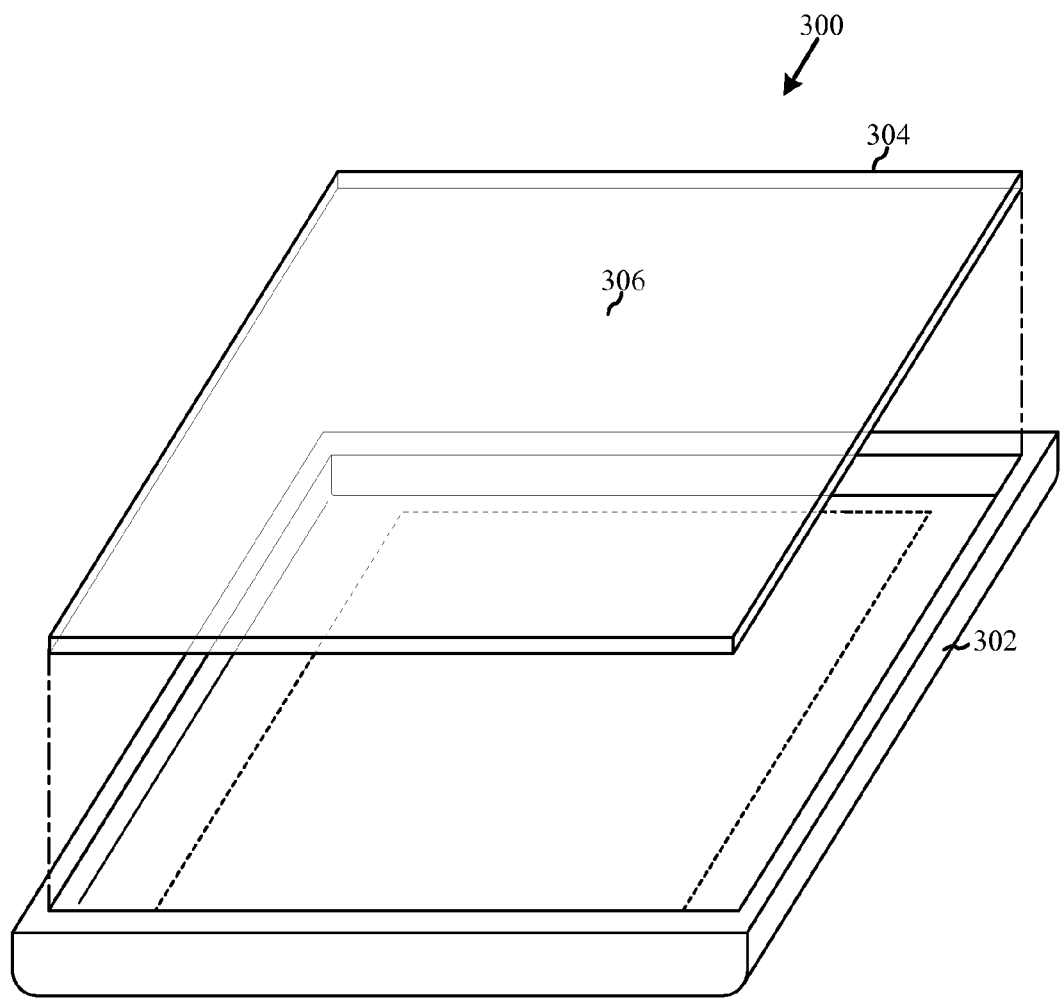
FIG. 7 illustrates another device housing according to an aspect of the disclosure.

FIGS. 6 and 7 illustrate exploded perspective views of the rear housing 302 and a front housing 304 including a screen or display 306, forming a housing 300 of a computing device. The components of the computing device 200 may be located in the housing 300. As illustrated in FIG. 6, the front housing 304 may be coupled to the rear housing 302 and extend over to be flush with an exterior perimeter of the side of the rear housing 302. In this aspect, the entire front housing 304 may be a display screen that has substantially the same size as an outer perimeter of the rear housing 302. This can allow for a display screen substantially the same size as the computing device and provided a streamlined look to the computing device.

In another aspect, illustrated in FIG. 7, the front housing 304 may be coupled to the rear housing 302 to fit within an interior perimeter of the rear housing 302. In this aspect, the outward face of the front housing 304 may be flush with the upward facing edge of the frame of the rear housing 302. As described above, the front housing 304 may be a display screen. In this aspect, the perimeter of the rear housing 302 may provide protection to the outer edges of the front housing 304 to prevent damage to the edges of the display screen. The front housing 304 may be coupled to the rear housing 302 using techniques known in the art.

Figure 8:
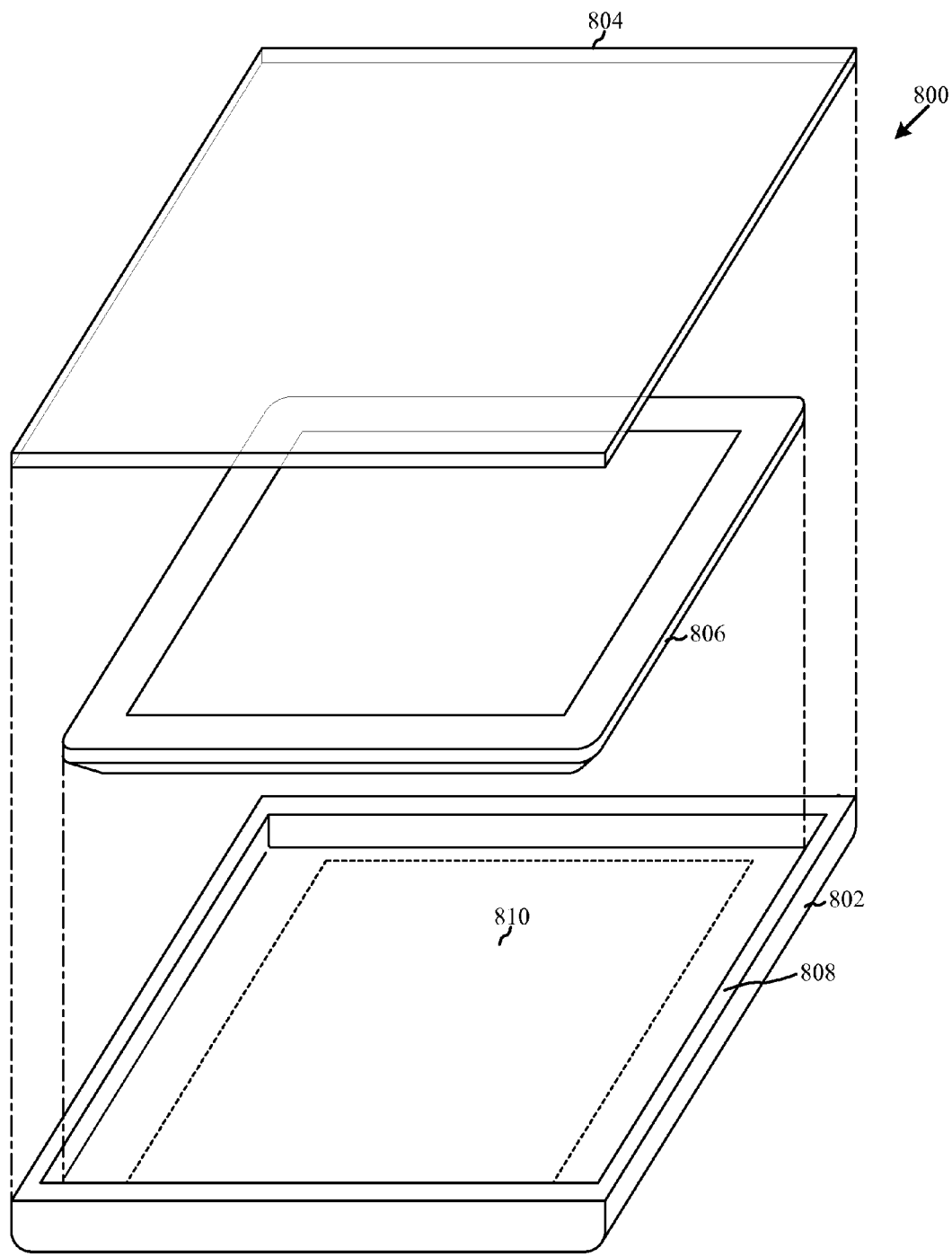
FIG. 8 illustrates a device case according to an aspect of the disclosure.

In another aspect, a similar approach as described above for a housing of a computing device may also be used to make external cases for electronic devices, such as the computing devices described above in reference to FIGS. 3-5C. FIG. 8 illustrates such a case including a computing device 806 therein. The case 800 may be an aftermarket accessory purchased separately from the computing device 806 and attached (and unattached) by a user. As illustrated, the case 800 includes a rear portion 802 and a front portion 804. The front portion 804 and the rear portion 802 may be coupled together to enclose the computing device 806. In this aspect, the rear portion 802 includes a support frame 808 and a rear panel 810 as described above with reference to FIGS. 3-5C. The front portion 804 may be a cover that is coupled to the rear portion 802 by a hinge to allow the cover to be opened. The front portion 804 may be a cover that surrounds a front edge of the computing device 806 to allow the screen of the computing device 806 to be exposed. The case may also be configured to join the front and rear portions and to enclose the computing device 806, in various other ways as with typical case covers.

Creating an enclosure, such as a housing or cover, out of the combination of metal or plastic and structurally reinforced foam provides a component that has improved toughness to deal with drop tumbles and other user abuses, but with an overall reduced weight of the casing. The structurally reinforced foam, based on a stiffness to weight ratio, is also more advantageous than traditional carbon fiber reinforced thermoplastics and thermosets. For example, the structurally reinforced foam may provide equivalent stiffness, as well as a lighter weight than traditional carbon fiber reinforced thermoplastics and thermosets.

Figure 9:
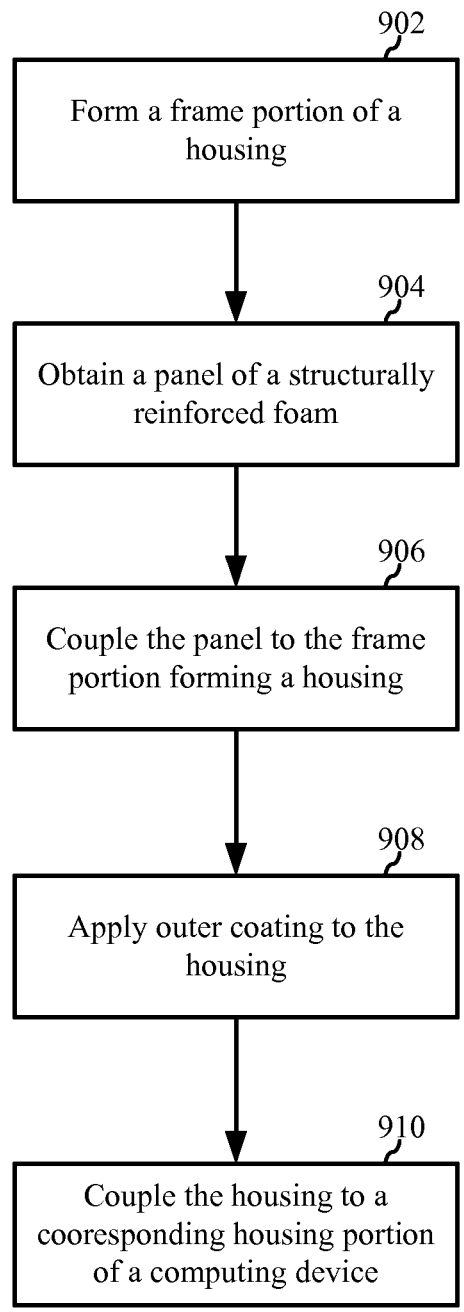
FIG. 9 illustrates a flow diagram illustrating an exemplary method for making a device housing according to aspects of the present disclosure.

In an aspect, the components described herein including the combination of metal or plastic and structurally reinforced foam may be manufactured using a variety of methods. FIG. 9 illustrates an exemplary method for making a device housing according to an aspect of the present disclosure. In block 902, a frame portion of the housing, such as the rear housing, is formed. The frame portion may be formed, for example, using diecast, injection molding, forging, CNC machining, or other techniques.

A structurally reinforced foam panel (as described above) is obtained, for example by forming the panel or cutting the panel out of a structurally reinforced foam, illustrated as block 904. The structurally reinforced foam may be cut, for example, using a laser cutting technique or a water jet cutting technique, to a desired shape. The structurally reinforced foam may include a foam layer that is coated with a primer layer prior to application of external metal layers to protect the foam layer.

The panel is physically coupled to the frame portion forming a housing, illustrated as block 906. The panel may be coupled to the frame portion using an adhesive (for example, a pressure sensitive adhesive, a liquid adhesive, etc.), thermal bonding technique, injection molding technique, mechanical coupling technique, fastened using fasteners (such as screws or nails), and other coupling techniques. In an aspect, the panel may include a portion that overlaps a ledge or lip, such as shown in FIG. 5D, of the frame portion around a perimeter of the aperture of the frame by about 1-3 millimeters or more, and the panel is coupled to the frame portion at the overlap. In another aspect, threaded inserts may be used to press fit the frame portion and the panel together.

A coating or skin may be applied to the housing, illustrated as block 908, to provide a single piece housing that has a streamlined and aesthetically pleasing look and feel.

The coating may also provide additional functions of increased toughness and durability. A computing device may then be assembled using the housing, for example, by coupling the housing to a corresponding housing portion, such as a front housing, and enclosing components of the computing device therein, illustrated as block 910.

While the reinforced structural composite is described with reference to housing components of computing devices, other components of other device may be made from the reinforced structural composite. For example, cases for devices, components for toys, automobiles, watercraft, furniture, etc. The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An electronic device, comprising:
   a housing that encloses and protects computing components of the electronic device, the housing comprising:
      a monolithic rigid support frame including sides extending substantially perpendicular to a base portion, the base portion forming an aperture in a central portion of the support frame;
      a structurally reinforced panel disposed in the aperture and physically coupled to the support frame, the structurally reinforced panel including:
         a first primer layer,
         a central foam layer onto which the first primer layer is applied, wherein the first primer layer penetrates less than 100 microns into the central foam layer, and
         a first metallic layer electroplated on the first primer layer; and
      wherein the structurally reinforced panel weighs less per unit volume because of a lower density than the monolithic rigid support frame.

2. The electronic device of claim 1, wherein the first primer layer is comprised of a metallic coating applied to the central foam layer to seal the central foam layer.

3. The electronic device of claim 1, further comprising:
   a second primer layer applied to the central foam layer on a side opposite the first primer layer; and
   a second metallic layer plated on the second primer layer.

4. A component for an electronic device, comprising:
   a housing that encloses and protects computing components of the electronic device, wherein at least a portion of the housing comprises:
      a foam layer;
      a first primer layer disposed on a first side of the foam layer, the first primer layer penetrating less than 100 microns into the foam layer; and
      a first metallic layer electroplated on the first primer layer;
   wherein the housing has a thickness, the thickness being less than 3 millimeters at a thinnest point of the housing.

5. The component of claim 4, wherein the at least a portion of the housing is joined to a display of the electronic device.

6. The component of claim 4, wherein a second portion of the housing is comprised of aluminum, titanium, magnesium, stainless steel, polymer, or plated polymer.

7. The component of claim 4, wherein the first primer layer is comprised of metallic coating.

8. The component of claim 4, wherein the first metallic layer is comprised of at least one of copper, nickel, copper-nickel, copper-cobalt, copper-nickel-chrome, nickel-chrome, cobalt, gold, or silver.

9. The component of claim 4, wherein the foam layer is comprised of elastomeric foam, polyurethane foam, thermoset foam, or syntactic foam.

10. The component of claim 4, wherein the component forms part of a rear housing of an electronic device.

11. The component of claim 4, further comprising a second metallic layer disposed on the first metallic layer.

12. The component of claim 4, wherein the foam layer extends through the entire housing.

13. An external case for an electronic device, comprising:
    a first portion adapted to receive the electronic device, the first portion including:
       a foam layer;
       a first primer layer disposed on a first side of the foam layer, the first primer layer penetrating less than 100 microns into the foam layer; and
       a first metallic layer electroplated on the first primer layer.

14. The external case of claim 13, wherein the first metallic layer comprises at least one of copper, nickel, copper-nickel, copper-cobalt, copper-nickel-chrome, nickel-chrome, cobalt, gold, or silver.

15. The external case of claim 13, further comprising a second metallic layer plated on the first metallic layer.

16. The external case of claim 13, wherein the first primer layer comprises at least one of metallic coating.

17. The external case of claim 13, wherein the foam layer comprises at least one of elastomeric foam, ridged or flexible polyurethane foam, thermoset foam, or syntactic foam.

18. The external case of claim 13, wherein the first primer layer forms a boundary between the foam layer and the first metallic layer.

19. The external case of claim 13, further comprising:
    a second primer layer disposed on a second side opposite the first side of the foam layer; and
    a second metallic layer disposed on the second primer layer.

* * * * *